J. Griffiths.
Globe Valve,
Nº 10,516. Patented Feb. 14, 1854.

UNITED STATES PATENT OFFICE.

JOHN GRIFFITHS, OF PHILADELPHIA, PENNSYLVANIA.

VALVE-COCK.

Specification of Letters Patent No. 10,516, dated February 14, 1854.

*To all whom it may concern:*

Be it known that I, JOHN GRIFFITHS, of the city and county of Philadelphia and State of Pennsylvania, have invented a new and useful Improvement in Valve-Cocks; and I do hereby declare that the following is a full, clear, and exact description of the construction and operation of the same, reference being had to the accompanying drawing, forming part of this specification, in which—

Figure 1:
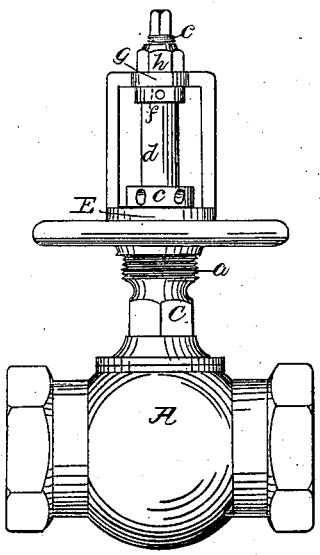
Figure 2:
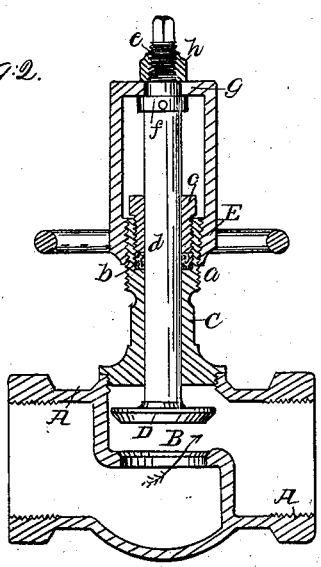

Figure 1, is a side view of a stop cock, constructed according to my invention. Fig. 2, is a longitudinal section of the same, through the center.

Similar letters of reference indicate corresponding parts, in both figures.

The valve cock possesses advantages over the plug cock in its lightness and the facility with which the valve is ground tight; but as the valve cock is at present constructed, it is practically very imperfect. It is usual to make the screw by which the valve is opened and closed, on the valve stem; and unless every part is very truly constructed, this will cause one side of the valve to close or bear in its seat harder than the other parts, which will be liable to bend the stem. The above difficulty is attended with worse consequences, when the valve has a broad bearing, as it is not so easily closed all around; and hence, it has been customary to make it with a narrow seat. The object of my invention is to construct the cock in such a way that the valve will always close truly, and thus allow it to be made with a bearing of such width as will enable it to be kept as tight as the best plug cock.

The nature of my invention consists in making the valve with a cylindrical stem passing through a hollow stem which is attached rigidly to, or forms part of, the body of the cock, and is furnished outside with a screw, to which is fitted a nut, which carries a yoke, in which the valve stem is capable of turning freely, but not of moving longitudinally. By turning the nut, the valve is raised and lowered, from and to its seat, in a right line; the valve being always kept in such position that it will fall truly into its seat and close tightly.

To enable those skilled in the art to make and use my invention, I will proceed to describe its construction and operation.

A, is the body of the cock, and, B, is the valve seat, which do not differ materially from other valve cocks.

C, is the hollow fixed stem, which, in the cock shown, is secured into the body; it is furnished at its upper part with an external screw, *a;* it is provided with a stuffing box, *b*, and gland, *c*, for the purpose of packing the valve stem.

D, is the valve, and *d*, its stem, which is furnished at its top with a screw, *e*, and, a little below the screw, with a collar, *f*.

E, is the nut, by which the valve is opened and closed; it is fitted to the screw, *a*, on the hollow fixed stem, and is provided with a wheel or lever by which it is turned; it is furnished above with a yoke, *g*, which fits easily to the valve stem above the collar, *f*, being confined to the stem by a nut, *h*, fitting to the screw, *e;* this nut fits down to a shoulder, so that it does not bite the yoke, but simply prevents a longitudinal motion, of the valve stem and nut, independently of each other, not preventing the turning of the nut. The valve is raised and lowered by the turning of the nut.

The valve stem is squared at the top to receive a wrench for grinding the valve. To grind the valve, the nut *h*, should be taken off. The valve of a cock of large size, constructed in this way, may be ground in a few minutes; whereas a three-inch plug will commonly take five or six, and sometimes ten, hours, to grind in tight, whenever it leaks.

In cocks of large size, the body, A, may be made of cast iron, and the seat, B, and stem, C, of brass, which construction will reduce the expense.

The invention is applicable to cocks of almost every description.

What I claim as my invention and desire to secure by Letters-Patent, is,

The combination of the hollow fixed stem C, the solid stem *d*, and the yoked nut E substantially in the manner and for the purpose herein described.

JOHN GRIFFITHS.

Witnesses:
 HENRY SIMPSON,
 WILLIAM ROSS.